March 10, 1953 — S. A. MINTZ — 2,630,747

LAWN EDGE TRIMMER MACHINE

Filed Aug. 2, 1946 — 2 SHEETS—SHEET 1

INVENTOR.
Samuel A. Mintz
BY
Evans + McCoy
ATTORNEYS

INVENTOR.
Samuel A. Mintz
BY
Evans + McCoy
ATTORNEYS

UNITED STATES PATENT OFFICE 2,630,747

LAWN EDGE-TRIMMER MACHINE

Samuel A. Mintz, Miami, Fla.

Application August 2, 1946, Serial No. 688,051

2 Claims. (Cl. 97—227)

The present invention relates to a machine for trimming and grooving the edges of a lawn along driveways, walks, curbs, flower beds, walls and other similar places.

It is an object of the present invention to provide an edge trimming and grooving machine employing a plurality of rotary tools which are readily removable and interchangeable to form various combinations, at the discretion of the operator, according to the particular cutting or trimming job to be accomplished for cutting and removing vegetation or ground along the marginal edge of a lawn adjacent to walks, driveways, etc., to provide clean and neat grooves or trenches and enhance the appearance of the lawn.

A further object is to provide a machine of the character specified which may also be used for cutting or trimming sod to provide a neat edge or to permit its removal for transplanting or other purposes.

Another object is to provide a cutting and trimming machine in which the rotary tools are power driven and act in a direction to assist advancing the machine along the area to be treated by the machine.

A still further object is to provide a lawn edging machine employing power-driven rotary tools and having the power unit and the rotary tools disposed at opposite sides of the axis of rotation of the load supporting wheels of the machine so that the weight of the power unit will tend to lift the cutters from their area of contact with the material to be cut.

Another object is to provide a machine of the character described, constructed in such a manner that if objects or material which cannot be cut thereby are encountered, damage to the machine will be minimized and overloading of the power unit is prevented.

A further object is to provide a lawn edge-trimming machine designed to be operated with equally desirable results on hard or soft surfaces, and employing a plurality of interchangeable rotary tools so that it may be operated in either direction longitudinally of the base to reach marginal portions of lawns not readily reached by present trimmers.

A further object is to provide a cutting and trimming machine utilizing a rotary guide element which revolves with the cutting elements to protect the same at all times and facilitates operating the machine in the desired path whether curved or straight.

Other objects and advantages will become apparent in the following detailed description accompanied by the drawings, in which.

Figures 1, 4:
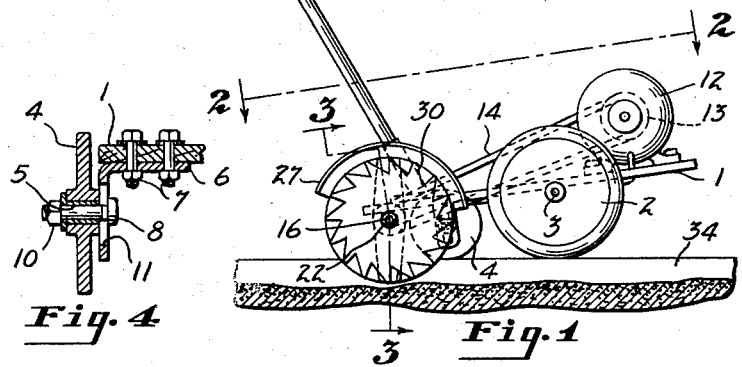
Figure 1 is a side elevation of a lawn trimming and grooving machine embodying the present invention.
Fig. 4 is a fragmentary sectional view taken substantially on line 4—4 of Fig. 2 to illustrate the adjustable means to regulate the permissible depth of cut of the machine.
Figure 2:
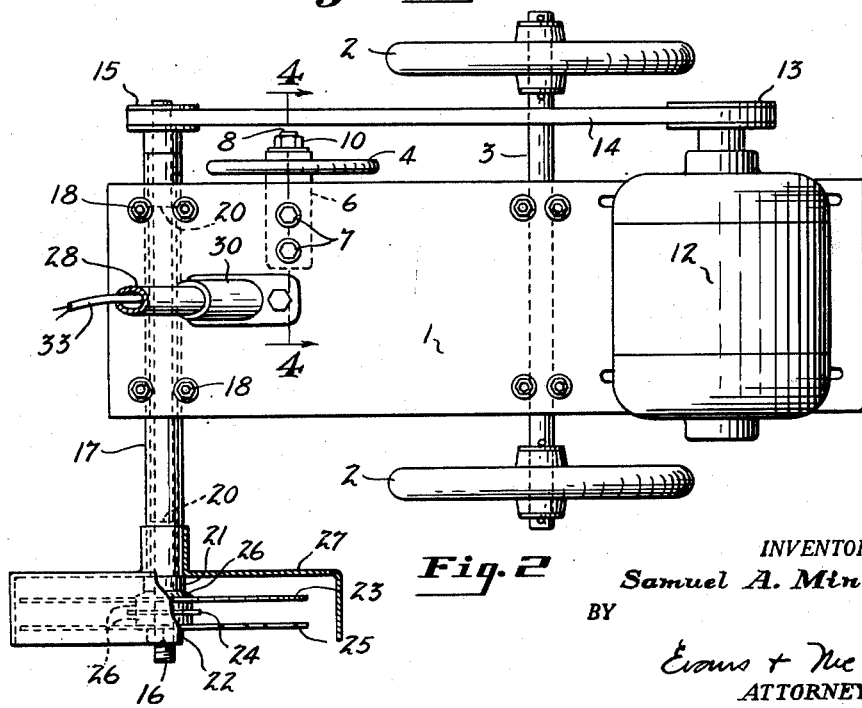
Fig. 2 is an enlarged top plan view of the machine with parts broken away, taken substantially on line 2—2 of Fig. 1.

The form of trimming and grooving machine embodying the present invention and illustrated in the drawings comprises a substantially flat rectangularly shaped base member 1 having mounted thereon for rotation a pair of wheels 2, the wheels being fixed to an axle 3 secured to the base member 1 by U-bolts passing through said base. To provide an additional suspension point a third wheel 4 is carried on a hollow stub shaft 5 bolted to an angle bracket 6 secured to the base member 1 by suitable bolts 7 as best shown in Figures 2 and 4. The shaft 5 is secured to the bracket 6 by a bolt 8 which passes through the bracket 6 and the shaft 5 and carries a nut 10. To adjust the maximum depth of cut of the machine, the bolt 8 rides in a vertical slot 11 in the angle bracket 6 so that the shaft 5 and wheel 4 may be adjusted vertically with respect to the base member 1.

Figure 3:
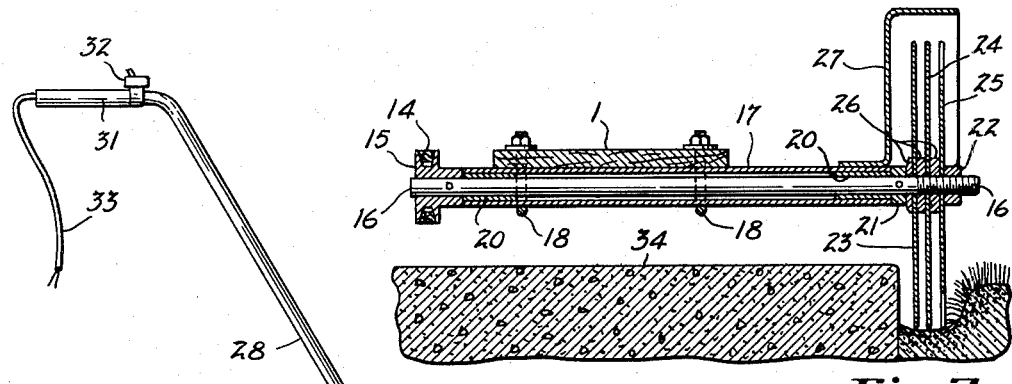
Fig. 3 is a cross sectional view taken substantially on line 3—3 of Fig. 1 to illustrate the position of the rotary cutting and guiding elements when the machine is in operation.
Figure 5:
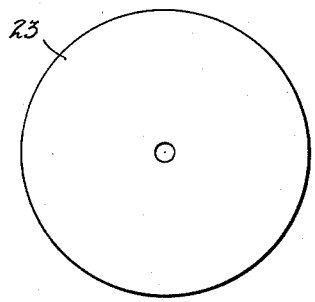
Figs. 5, 6 and 7 are enlarged elevational views of the rotary cutting and guiding tools which may be interchangeably used in various combinations on the machine.
Figure 6:
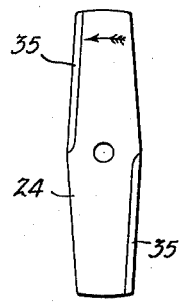
Figure 7:
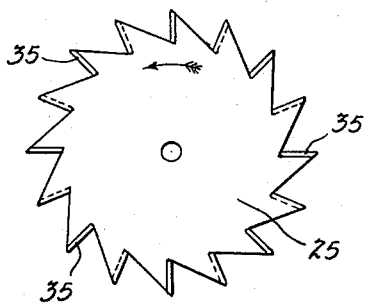

A power unit 12, shown in the drawings as an electric motor, is mounted on the base member in any suitable manner. It is to be understood that the power unit may comprise any other suitable source of power sufficient to rotate the cutting and guiding elements at a relatively high speed. For example, a small gasoline engine could be employed as well as the electric motor shown. Extending laterally from the power unit is a shaft having keyed thereto a driving pulley 13 on which is mounted a suitable belt 14 operably connected with a driven pulley 15. The driven pulley is pinned or otherwise secured to a driven shaft 16 which rotates within a hollow sleeve or tube 17 secured to the base member 1 by the U-bolts 18. Disposed within the tube 17 at suitable intervals are bushings 20 to provide suitable bearing surfaces during rotation of the shaft 16. The shaft 16 extends outwardly from the base 1 on the side opposite the pulley 15 to carry the rotary cutting tools and guides. At a desired point near the end of the shaft a suitable collar 21 is pinned or keyed to the shaft 16 and cooperates with the fixed pulley 15 to prevent longitudinal movement of the shaft within the bushings 20 and the tube 17. The end of the shaft 16 is threaded to accommodate a nut 22, and between the nut 22 and the collar 21 may be disposed any desired assemblage of rotary cutting, guiding and spacing elements. As shown in Figures 2 and 3, a guide disk, illustrated in Fig. 5, a propeller type cutter 24, illustrated in Fig. 6, and a serrated or saw-tooth cutter 25, illustrated in Fig. 7, are successively mounted on the shaft, separated from the collar 21 and spaced by suitable washers or spacing elements 26. If desired, the cutting and guide elements may be covered by an arcuate shield or hood 27 suitably secured to the tube 17 inwardly of the collar 21.

To assist in guiding the machine or advancing it in the desired path, a handle member 28 is secured to the base 1 by a suitable journal bracket 30 bolted to the base 1. As shown in Figs. 1 and 2, the handle 18 is a hollow tube which may be secured by pinning it to the annular portion of the journal bracket 30 and may be used to carry the electric wires which provide a source of current for the electric motor 12. The wires extend through the handle 18 and through the grip portion 31 in which region they may be connected to a switch 32, mounted on the handle, to start and stop the motor. The electric wires 33 extend from the grip portion 31 of the handle 28 and sufficient wire may be provided to plug in to a suitable source of current and have enough length to permit adequate movement of the machine at a distance from the electric plug. The wires extend downwardly through the handle and the journal bracket 30 and pass through the plane of the base member 1 where they may extend along the underside of the base and thence back through the base for connection to the electric motor.

In order to adjust the tension in the belt 14, the motor 12 is secured to the base through suitable slots contained in the base so that the motor may be adjusted along the base as desired. Preferably the motor should be disposed so that the belt 14 is sufficiently tight for properly driving the pulley 15 but sufficiently loose to prevent overloading the motor 12.

In operation, the machine may be pushed or pulled with the rotary cutters and guide means disposed in the area where it is desired to trim and groove the marginal portions of the lawn. The form of machine shown in Figs. 1 and 2 is adapted to be pulled by the grip portion 31 of the handle 28.

When the machine is advanced by guiding and pulling it with the operator facing the rotary cutting and guiding mechanism, several advantages of operation are obtained. The cutters are in full view at all times and guide marks may be readily followed. The forward speed of the machine may be increased or retarded by lowering or raising the rotary mechanism to vary the frictional engagement with the ground. Cuttings and debris are thrown by the swiftly rotating members in a direction away from the operator and such refuse on striking the hood 27 will deflect to the side of the groove where it may be readily accumulated for disposal.

It will be noticed that the power unit 12 is disposed along the base member at the opposite side of the axle 3 and the wheels 2 from the driven shaft 16 which carries the rotary elements, so that the weight of the motor will balance the weight of the driven shaft and rotary mechanism. In fact, it is preferable that the motor overbalance the driven shaft and cutter mechanism so that if it is desired to stop cutting action it is only necessary to release the grip or handle and the machine will rotate about the axle 3 due to the weight of the motor lifting the cutters out of engagement with the ground.

In the same manner the amount of engagement between the ground or vegetation and the cutting mechanism will be established by the operator according to the amount of depression of the grip to advance the cutting mechanism into cutting engagement with the ground, this depth of cut being limited by the adjustment of the adjustable wheel 4 with respect to the angle bracket 6 and the base 1. In the event that the cutting mechanism engages rocks or other material which would cause an immediate cessation of rotation of the cutting mechanism, damage to the motor and/or cutters will be minimized. Since the cutters would be held in position where they cannot rotate, the belt 14 will merely slip at either of its pulleys 13 and 15. The operator can also prevent injury to the mechanism by loosening his grip on the handle 28 and the weight of the motor 12 will lift the cutting mechanism out of engagement with the material, or the operator may flip the hand switch 32 located in the region of the grip 31 and thus stop the motor.

The cutting tools are designed for operation at relatively high speeds such as, for example, in excess of 2,000 R. P. M. so that the cutters exert a chopping action rather than a shearing action, and when in contact with ground or sod the cutters will gouge and tear rather than slice. The assembly of cutters shown in Figs. 1, 2, and 3 are particularly useful for forming a relatively wide groove at the margin of the lawn, and this assemblage may be used when the trough or groove is not well defined. As shown in Fig. 3 the machine may be operated along the walk or drive indicated by the numeral 34 with the cutting mechanism disposed adjacent the walk and slightly spaced therefrom. The operator may retreat slowly along the walk and is enabled to see and guide the cutting mechanism along its cutting path. With the guide disk 23 disposed at the innermost position along the shaft 16, the cutters are protected from engagement with the edge of the walk. The guide disk will also assist in maintaining the proper depth of cut in the groove. The propeller type cutter 24 and the notched cutter 25 then rotate and chop or tear the ground and vegetation in the bottom of the groove and also any vegetation which may extend laterally into the groove.

Figure 8:
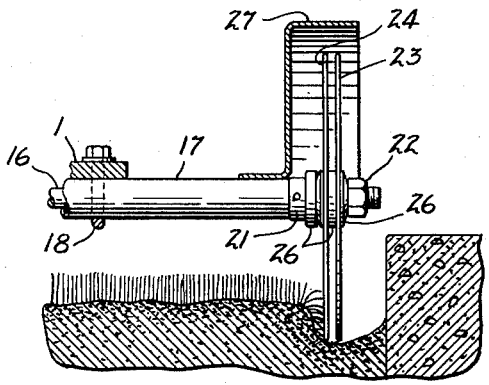
Fig. 8 is a fragmentary elevational view similar to Fig. 3, but illustrating a different combination of cutting and guiding elements from that illustrated in Figs. 1, 2 and 3.
Figure 9:
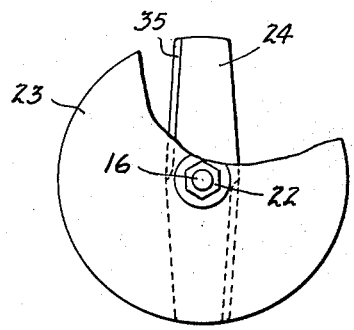
Fig. 9 is an end elevational view showing details of the assembly of cutting and guiding elements in Fig. 8.

Fig. 8 illustrates the assemblage of cutters believed to be preferable for forming a relatively narrow groove along side of a curb or in which position it is necessary to move the machine over the surface of the lawn and in this instance, since the machine abuts the curb, the guide disk 23 is placed in the outermost position adjacent the nut 22 with the propeller type cutter 24 disposed inwardly of the guide disk. It will be understood that the various assemblages of cutters and guide disks may be varied according to the desire of the operator and the nature of the groove which it is desired to cut.

Many other variations in the number, size and configuration of rotary cutting elements are possible and the several shown in the drawings are for purposes of illustration. Generally it is considered preferable to employ at least two cutters, such as one of the propeller-type cutters and one serrated tooth cutter in combination with a guide disk, when cutting a groove for the first time or for widening or deepening an existing groove. Where the groove is already defined and it is desired to cut vegetation growing in the groove or extending into the groove, it is usually only necessary to utilize one cutter and it is considered that the propeller-type cutter is most suited for this kind of work.

Since the cutting tools may be exposed to engagement with highly abrasive objects such as sand, earth, stones and the like, it is believed preferable to employ a cutting edge suited for this exposure. It is believed preferable not to sharpen the tool so that it is provided with a feather edge at the tip of the cutting surface, but rather to leave a relatively wide, strong edge. An extremely satisfactory tool has been obtained by providing a relatively wide land along the side face of the cutting edge adjacent to the relatively blunt, strong edge. This land is indicated by the numeral 35 in Figs. 6 and 7.

The propeller-type cutter has also proved to be an efficient and economical tool. It provides two cutting edges of substantial radial extent which may be used until worn. Then by sharpening the opposite edges of each blade the cutter may be used for a similar period merely by turning it over to reverse the sides.

A machine embodying the present invention may be utilized to great advantage for cutting sod for removal to transplant it or for other purposes. In this application it is believed preferable to employ the serrated cutter alone, and when so doing it is a relatively easy job to form flower beds having curved or straight borders and to provide edges around trees or shrubs of any desired configuration.

Figure 10:
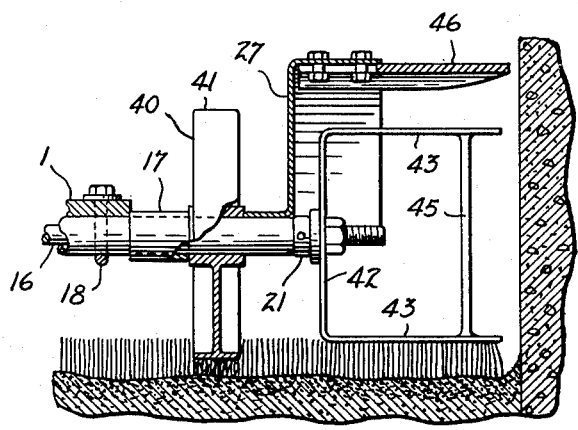
Fig. 10 is a fragmentary elevational view of a modified form of rotary cutting element useful for trimming a marginal edge of a lawn closely adjacent to a vertical wall.
Figure 11:
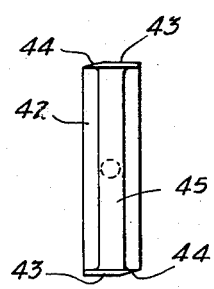
Fig. 11 is an end elevational view of the rotary tool shown in Fig. 10.

In Figs. 10 and 11 a modification of the cutting mechanism is indicated, and this form of invention is particularly adapted for cutting the grass in regions closely adjacent a wall or other vertical structure, which portions are not reached by the conventional lawn mower and require a special trimming machine. In this modification a wheel 40 having a relatively wide rim portion 41 is removably mounted for rotation on the tube 17 to ride over the lawn and maintain the shaft 16 at the proper distance from the lawn. A rotary cutter 42 is carried by the shaft and provided at its periphery with laterally extending blade portions 43 disposed parallel to the axis of the rotation of the cutter and having sharpened cutting edges 44. To support the free ends of the blade portions 43, a tie rod or brace 45 extends therebetween and maintains the cutting blades in their position substantially parallel to the axis of rotation of the cutter 42. In this modification a guide mechanism is also provided to prevent the cutter from engagement with the vertical wall. This guide mechanism may be in the form of a rod or arcuate member 46 which may be carried by the shield or hood 27 and is preferably adjustably mounted thereto so that it may be laterally extended longitudinally of the shaft 16 for adjustment.

It will be seen that the present invention provides a cutting, trimming or grooving machine especially advantageous for trimming and grooving marginal portions of a lawn which are not reached by conventional lawn mowers. Ornamental borders and other designs may be provided in the lawn to enhance its appearance. By changing the assembly of rotary tools, any desired type of trimming job may be readily accomplished. Great variation in the width or character of the groove to be formed can be obtained by varying the number and spacing of the rotary cutting and guiding elements, the intervals between the various elements being controlled by the use of wider or a greater number of spacers 26, seen best in Figs. 1, 3 and 8.

The present lawn-edging machine has been found to be superior over present devices to provide clean and neat grooves or trenches along the edges of walks, drives, curbs and the like. In the southern climates a lawn will grow throughout the year and the grass has great strength with a tough and wiry nature. With the present machine employing relatively high speed rotary cutters, such a lawn may be readily trimmed and grooved to provide an exceedingly neat and clean appearance.

Excellent adaptability is very readily provided by the above described device. With the rotary elements easily interchangeable, extremely wide variations in cutting or grooving can be accomplished with superior results. The suspension of the machine at the three points on the supporting surface permits advantageous use of the machine on either hard surfaces, such as walks, or soft surfaces, such as a lawn. By changing the order of the tools, the device may be operated in either direction longitudinally of the base member 1. On rough, irregular surfaces which might tend to prevent even cutting engagement, the base member may be tilted about the axle 3 to increase or decrease the area of contact of the rotary tools with the material being cut. The same result may be obtained in a different manner by tilting the machine about the line of contact formed by the contact point of the adjustable wheel 4 and either of the wheels 2. In traveling over an irregular surface, contact of the wheels with irregularities may also tend to cause the machine to deviate from its desired course. It has been found that by increasing the pressure on the adjustable wheel 4, to assure a firmer contact with the supporting surface, the machine may be guided in the desired direction without difficulty.

It is to be understood that the foregoing description of the preferred embodiments of my invention is not intended to limit the scope thereof as defined by the attached claims.

What I claim is:

1. An edge trimmer comprising a base, a motor mounted on one end of said base, a transversely extending driven shaft journaled in a fixed location on said base adjacent the opposite end thereof, said driven shaft having one end that projects beyond one side of said base, means operatively connecting said motor to said shaft for driving the shaft, at least one rotary cutter mounted laterally to one side of said base on said projecting end of said driven shaft for rotation therewith, a handle rigidly connected to said base and extending upwardly therefrom and longitudinally beyond the end thereof on which said driven shaft is journaled, a pair of base supporting wheels mounted on opposite sides of said base for free and independent rotation about a fixed transverse axis located between the longitudinal center of gravity of the trimmer and the end of said base on which the driven shaft is journaled, whereby the motor end of the base will overbalance the opposite end of the base and normally hold the cutter above a surface on which said wheels are resting, and downward movement of the free end of said handle will positively lower said cutter about said transverse axis to a desired cutting depth below such surface, the cutter being disposed laterally outwardly beyond the supporting wheel on the same side of the machine.

2. An edge trimmer comprising a base, a motor mounted on one end of said base, a transversely extending driven shaft journaled in a fixed location on said base adjacent the opposite end thereof, said driven shaft having one end that projects beyond one side of said base, means operatively connecting said motor to said shaft for driving the shaft, at least one rotary cutter mounted laterally to one side of said base on said projecting end of said driven shaft for rotation therewith, a handle rigidly connected to said base and extending upwardly therefrom and longitudinally beyond the end thereof on which said driven shaft is journaled, a pair of base supporting wheels mounted on opposite sides of said base for free and independent rotation about a fixed transverse axis located between the longitudinal center of gravity of the trimmer and the end of said base on which the driven shaft is journaled, whereby the motor end of the base will overbalance the opposite end of the base and normally hold the cutter above a surface on which said wheels are resting, and downward movement of the free end of said handle will positively lower said cutter about said transverse axis to a desired cutting depth below such surface, the cutter being disposed laterally outwardly beyond the supporting wheel on the same side of the machine, and a third wheel mounted on the cutter end of said base for rotation about a transverse axis at an elevation for engaging a supporting surface only after the cutter has been lowered to extend below said supporting surface, to limit the depth of cut, and means for adjusting the elevation of said third wheel for varying the maximum depth of cut, said third wheel being mounted on said base adjacent the side thereof opposite the side on which the cutter is mounted.

SAMUEL A. MINTZ.

REFERENCES CITED

The following references are of record in the file of this patent:

UNITED STATES PATENTS

| Number | Name | Date |
|---|---|---|
| 1,600,663 | Barrowman | Sept. 21, 1926 |
| 1,644,068 | McBride | Oct. 4, 1927 |
| 1,742,563 | Stidger | Jan. 7, 1930 |
| 1,846,507 | Boring | Feb. 23, 1932 |
| 1,878,422 | Hamshaw | Sept. 20, 1932 |
| 2,176,261 | Kelsey | Oct. 17, 1939 |
| 2,244,099 | Chase | June 3, 1941 |
| 2,312,569 | Maga | Mar. 2, 1943 |
| 2,412,704 | Jaques | Dec. 17, 1946 |
| 2,432,922 | Muzzy | Dec. 16, 1947 |
| 2,490,896 | Burns | Dec. 13, 1949 |

FOREIGN PATENTS

| Number | Country | Date |
|---|---|---|
| 298,119 | Great Britain | Oct. 11, 1928 |